(12) United States Patent
Wihlborg

(10) Patent No.: US 7,390,149 B2
(45) Date of Patent: Jun. 24, 2008

(54) TOOL FOR CHIP REMOVING MACHINING, AND A BASIC BODY AND A LOCK MEMBER THEREFOR

(75) Inventor: Lennart Wihlborg, Ockelbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/641,950

(22) Filed: Dec. 20, 2006

(65) Prior Publication Data

US 2007/0183857 A1    Aug. 9, 2007

(30) Foreign Application Priority Data

Dec. 21, 2005    (SE)    ................................ 0502832

(51) Int. Cl.
B23C 5/22    (2006.01)

(52) U.S. Cl. ............................ 407/35; 407/67; 407/102; 407/113

(58) Field of Classification Search .................. 407/35, 407/66, 67, 47, 48, 99, 101–104, 107, 113; B23C 5/22
See application file for complete search history.

(56) References Cited

U.S. PATENT DOCUMENTS

| 3,125,798 | A | * | 3/1964 | Stein | 407/83 |
| 4,583,886 | A | * | 4/1986 | Drescher | 407/40 |
| 4,744,703 | A | * | 5/1988 | Cochran | 407/45 |
| 5,988,952 | A | * | 11/1999 | Antoun | 407/107 |
| 6,152,658 | A | * | 11/2000 | Satran et al. | 407/103 |
| 6,158,928 | A | * | 12/2000 | Hecht | 407/102 |
| 6,164,878 | A | * | 12/2000 | Satran et al. | 407/113 |
| 6,234,724 | B1 | * | 5/2001 | Satran et al. | 407/43 |
| 6,540,448 | B2 | * | 4/2003 | Johnson | 407/35 |
| 6,607,334 | B2 | * | 8/2003 | Satran et al. | 407/35 |
| 6,796,750 | B2 | * | 9/2004 | Men | 407/35 |
| 7,179,021 | B2 | * | 2/2007 | Shaheen | 407/107 |
| 2003/0059262 | A1 | | 3/2003 | Men | |
| 2006/0275088 | A1 | * | 12/2006 | Lehto et al. | 407/40 |
| 2007/0009334 | A1 | * | 1/2007 | Edler | 407/107 |

FOREIGN PATENT DOCUMENTS

DE    93 05 518 U1    7/1993
FR    1 522 975 A    4/1968

* cited by examiner

Primary Examiner—Monica S. Carter
Assistant Examiner—Sara Addisu
(74) Attorney, Agent, or Firm—Drinker Biddle & Reath LLP

(57) ABSTRACT

A tool for chip removing machining, including a basic body and a replaceable cutting insert that has a center axis and is detachably mounted in an insert seat formed in the basic body. The seat is delimited by a bottom surface and at least one side support surface. The cutting insert includes an out of round engagement surface that is pressed against an out of round shoulder surface to rotationally secure the cutting insert. The shoulder surface is included in a separate lock member that is partially inserted in a space formed in the basic body, the space opening towards the insert seat and located between the side support surface and the bottom surface of the insert seat such that the lock member rotationally secures a lower part of the cutting insert, while an upper part of the cutting insert is supported by the side support surface.

11 Claims, 3 Drawing Sheets

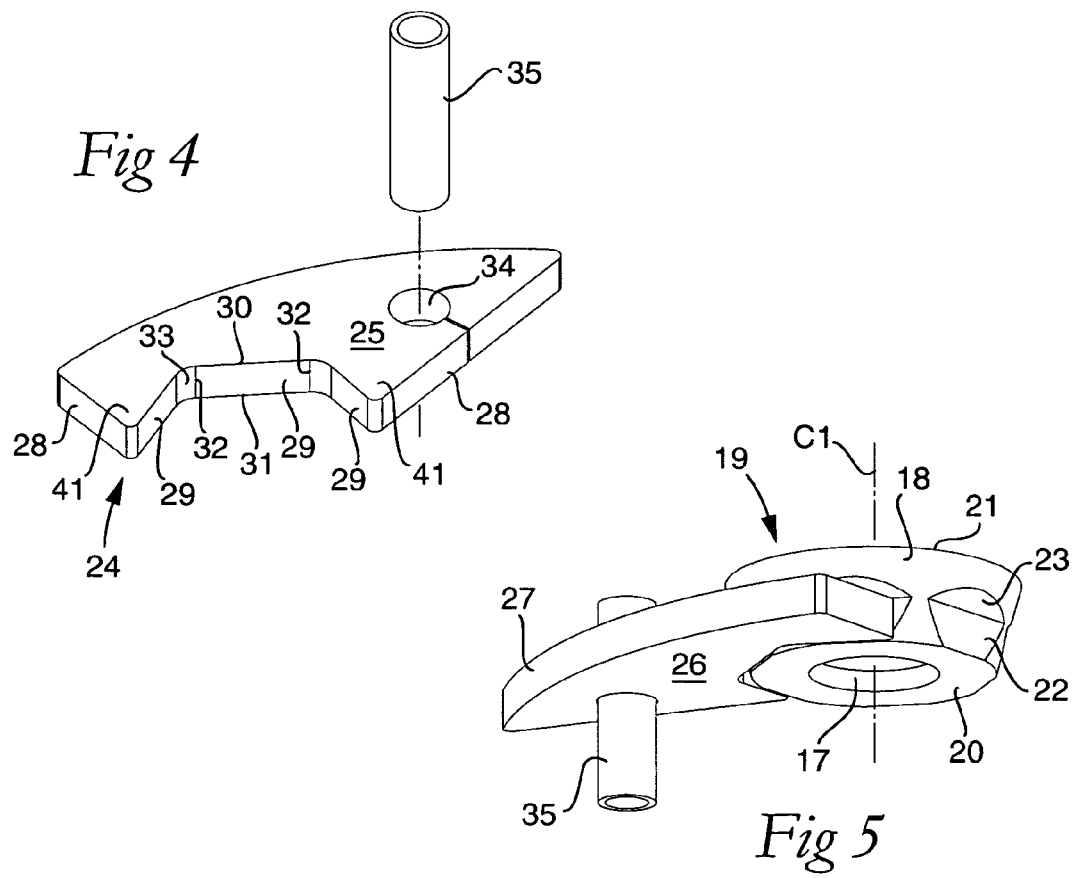
*Fig 4*
*Fig 5*
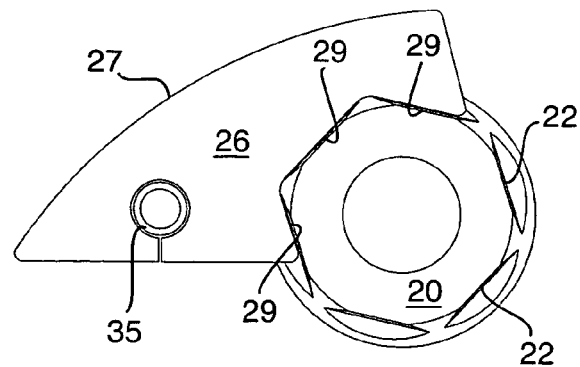
*Fig 6*

TOOL FOR CHIP REMOVING MACHINING, AND A BASIC BODY AND A LOCK MEMBER THEREFOR

This application claims priority under 35 U.S.C. § 119 to Sweden Patent Application No. 0502832-9, filed on Dec. 21, 2005, the disclosure of which is incorporated by reference herein in its entirety.

FIELD OF THE INVENTION

The present invention relates generally to a tool for chip removing machining of the type that includes a basic body and a replaceable cutting insert that has a geometric center and is detachably mounted in an insert seat formed in the basic body, which seat is delimited by a bottom surface and at least one side support surface, the cutting insert including an out of round engagement surface that is pressed against a likewise out of round shoulder surface in order to rotationally secure the cutting insert. The invention also relates to a basic body and a lock member, respectively, for such tools.

BACKGROUND OF THE INVENTION

Milling cutters may be equipped with a plurality of small and round cutting inserts that are generally pulley-shaped and have a circular, endless edge between a topside and a circumferential clearance surface, as well as a number of out of round engagement surfaces adjacent to the underside. A usual existing cutting insert of this type is formed with six planar, identical and equidistant engagement surfaces, which together give the bottom part of the cutting insert a hexagonal, nut-like shape. By bringing this bottom part in engagement with a mating, hexagonal countersink in the bottom of the insert seat, the cutting insert is rotationally secured, i.e., is kept in position without rotating. Simultaneously, the cutting forces, which are considerably greater than the forces that aim to rotate the cutting insert, are carried by the bottom of the insert seat, as well as by one or more rotationally symmetrical arched side support surfaces against which the rotationally symmetrical and endless clearance surface of the cutting insert is pressed.

As long as the cutting inserts are large and few in number, the polygonal countersink in the bottom of the individual insert seat can be made without major difficulties, viz. by milling and/or drilling by means of conventional cutting tools. However, if the milling cutter should be equipped with small cutting inserts, and in particular, many small cutting inserts, difficulties arise in forming the countersink. In such cases, the plurality of (e.g., six) planar shoulder surfaces, which together form the countersink, will become so exceptionally small that traditional cutting tools cannot be used to generate the proper surfaces, as well as the requisite clearances between the same. Studies made on the question whether it would be possible to mill cut the surfaces by means of special shank-end mills having a diameter of down to 1 mm have shown that this alternative is not realistic. When the insert seats are numerous, i.e., located close to each other, the accessibility for the cutting tools is further reduced.

The present invention aims at obviating the above-mentioned difficulties. Therefore, a primary object of the invention is to provide a tool that can be constructed with small and numerous cutting inserts, which are rotationally secured by the use of means that are simple and inexpensive to provide.

Another object of the invention is to improve the rotational securing of the cutting inserts so far that the risk of unintentional rotation of the cutting insert is minimized.

Yet another object of the invention is to provide a tool in which the risk of damage, e.g., wear damage, to the expensive basic body is reduced to a minimum.

SUMMARY OF THE INVENTION

In an embodiment of the invention, the planar shoulder surface or surfaces, which co-operate with the planar engagement surfaces of the cutting insert, are formed in a separate lock member instead of in a countersink, which has to be accomplished by chip removing machining in the basic body. The separate lock member can in a simple way be made in a machining operation that is separate from the manufacture of the basic body, and can then be mounted in a space that is formed in the basic body in a simple and fast way.

In an embodiment, the invention provides a tool for chip removing machining, including a basic body and a replaceable cutting insert that has a center axis and is detachably mounted in an insert seat formed in the basic body. The seat is delimited by a bottom surface and at least one side support surface. The cutting insert includes an out of round engagement surface that is pressed against an out of round shoulder surface to rotationally secure the cutting insert. The shoulder surface is included in a separate lock member that is partially inserted in a space formed in the basic body, the space opening towards the insert seat and located between the side support surface and the bottom surface of the insert seat such that the lock member rotationally secures a lower part of the cutting insert, while an upper part of the cutting insert is supported by the side support surface.

In another embodiment, the invention provides a basic body for tools for chip removing machining, including an insert seat that is delimited by a bottom surface and at least one side support surface, such that a space for the receipt of a lock member opens towards the insert seat and is located between the side support surface and the bottom surface.

In yet another embodiment, the invention provides a lock member for a tool for chip removing machining, including a plate that in a front part has at least one out of round shoulder surface and in a rear part includes an aperture for the receipt of a male securing element to secure the plate in a space within a basic body of the tool.

In still another embodiment, the invention provides a tool for chip removing machining, including a basic body, an insert seat formed in the basic body and including a bottom surface and at least one side support surface, a space formed in the basic body, the space opening towards the insert seat at the side support surface and the bottom surface of the insert seat, a cutting insert mounted in the insert seat, the cutting insert including an out of round engagement surface, and a lock member inserted in the space formed in the basic body, the lock member including an out of round shoulder surface. The out of round engagement surface of the cutting insert is mated with the out of round shoulder surface of the lock member such that the lock member rotationally secures a first portion of the cutting insert, while a second portion of the cutting insert is supported by the side support surface.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 4 is an enlarged perspective exploded view of the lock member, as well as a tubular pin of the same;

FIG. 5 is a perspective view as viewed from below of the lock member in co-operation with a round cutting insert; and FIG. 6 is a plan view from below the lock member and the cutting insert.

DETAILED DESCRIPTION OF THE PREFERRED EMBODIMENTS

Below, an embodiment of the invention will be described in connection with a rotatable cutting tool in the form of a milling cutter for chip removing metal machining and including a plurality of cutting inserts and insert seats. However, the invention also applies to other cutting tools, e.g., fixed turning tools having only one or a few cutting inserts and insert seats, respectively.

Figure 1:
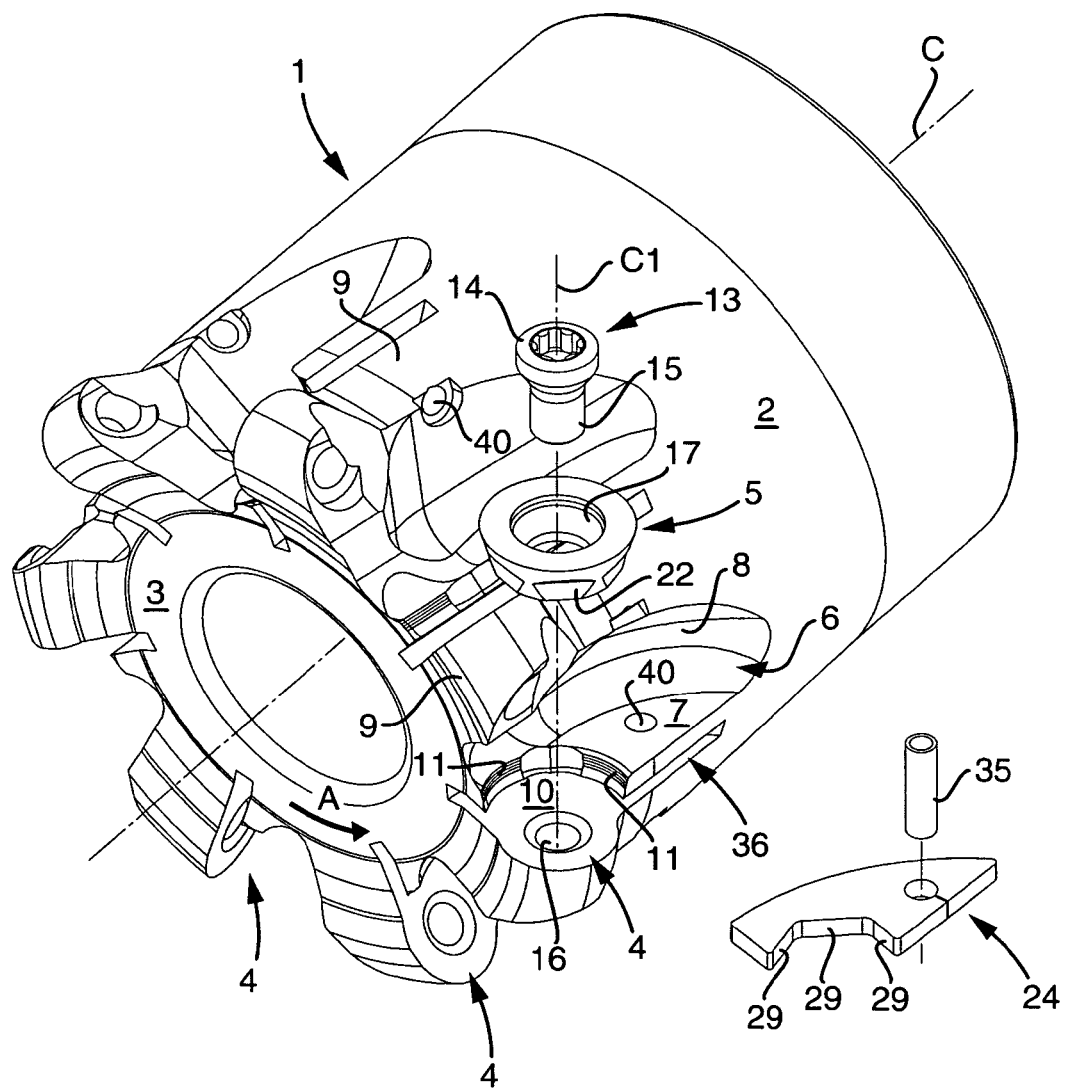
FIG. 1 is a perspective exploded view of a tool in the form of a milling cutter, which includes a rotatable basic body, a cutting insert and a lock member being shown separated from the basic body.

The milling cutter shown in FIG. 1 includes a basic body 1 that is rotatable around a center axis C and has an envelope surface 2 having a rotationally symmetrical, in this case cylindrical, shape, and a planar, ring-shaped front end surface 3. In the transition between the envelope surface 2 and the front end surface 3, a number of peripherally separated insert seats 4 are formed, which receive cutting inserts 5, only one of which is shown in FIG. 1. In the rearward direction from each individual insert seat 4, a chip pocket 6 extends, which in this case is delimited by a planar, shelf-like surface 7, as well as by at least one concavely arched surface 8. The different chip pockets and insert seats are separated by partition walls or ridges 9. In operation, the basic body rotates in the direction of the arrow A. As viewed in the direction of rotation, the shelf surface 7 forms a front side of the individual partition wall 9, while the surface 8 forms a back side of an adjacent partition wall.

The individual insert seat 4 is countersunk in relation to the shelf surface 7 and includes a planar bottom surface 10 as well as two peripherally separated side support surfaces 11 against which an endless, rotationally symmetrical clearance surface of the cutting insert is pressable.

In the embodiment exemplified in FIG. 1, the cutting insert 5 is fixed by means of a screw 13, which in addition to a head 14 includes a shank 15 having a male thread, which can be tightened in a female thread of a hole 16, which opens in the bottom surface 10 of the insert seat. The shank of the screw passes through a central hole 17 of the cutting insert. A center axis of the cutting insert 5 and the hole 16 is designated C1.

With reference to FIG. 5, the cutting insert 5 has a rotationally symmetrical clearance surface 18, which extends between a topside 19 and an underside 20, the transition between the topside and the clearance surface forming an endless, circular cutting edge 21. The clearance surface 18 is conical and converges in the downward direction. In the bottom part of the cutting insert, a plurality of planar engagement surfaces 22 are formed, which together form a polygonal configuration. Specifically, in this case the cutting insert includes six such engagement surfaces 22, which impart the bottom part of the cutting insert a nut-like shape. Each surface 22 could be parallel to the center axis C1 of the cutting insert, but is in the example inclined at a moderate angle (approx. 3°) to the center axis C1, more precisely in such a way that the lower borderline of the surface is situated radially nearer the center axis C1 than the upper borderline. Above the individual engagement surface 22, there is a crescent-shaped facet surface 23.

In milling cutter tools previously known, the individual cutting insert has been rotationally secured in the appurtenant insert seat 4 by being applied in a hexagonally or polygonally shaped countersink in the bottom surface 10 of the insert seat. As has been mentioned initially, such countersinks may be realized without insurmountable problems as long as the cutting inserts are large (>16 mm) and/or few in number (e.g., four), more precisely by machining in the proper basic body 1. However, in the example shown, the cutting inserts are small (<16 mm) and numerous (seven). As such, the engagement surfaces 22 of the cutting insert require very diminutive shoulder surfaces in the insert seat, and the chip pockets 6 are located close to each other, with the concave limiting surfaces 8 of the partition walls 9 intruding on the space above the individual insert seat.

According to an embodiment of the invention, the above-mentioned difficulties are overcome by means of a lock member 24, which is made in the form of a separate attachment. In the shown, preferred embodiment, the lock member 24 (see FIGS. 4-6) has the shape of a plate that has top- and undersides 25, 26, which advantageously are planar and parallel. In the example, the lock plate 24 is crescent-like so far that the contour shape thereof is determined by an arched, rear edge surface 27, as well as two straight or planar edge surfaces 28, which extend toward a common corner area in which a recess is formed, which is delimited by a number of planar, i.e., out of round, shoulder surfaces 29. Specifically, the recess is delimited by three shoulder surfaces 29, which mutually form the same angle as the engagement surfaces 22 of the cutting insert form with each other. In the example, when the number of engagement surfaces 22 of the cutting insert is six, the individual shoulder surface 29 forms an angle of 120° with each adjacent shoulder surface. Each individual shoulder surface 29 is delimited between upper and lower borderlines 30, 31 and two end borderlines 32. Advantageously, the surface 29 is planar in the sense that not only an imaginary line between the end borderlines 32, but also an imaginary line between the upper and lower borderlines 30, 31 is straight. The surface in question may extend either perpendicularly to the topside 25 of the plate or at an obtuse angle to the same, e.g., with the same angle of inclination (3°) as the engagement surface 22 has in relation to the center axis of the cutting insert. However, the surface 29 does not need to be completely planar. Thus, the same may, for instance, be straight in the extension thereof between the end borderlines 32, but arched, more precisely convexly arched, as viewed in the extension thereof between the upper and lower borderlines 30, 31. Between the different shoulder surfaces 29, radius transitions 33 are formed. It should be pointed out that at least the inner shoulder surface 29 is longer than the individual engagement surface 22 of the cutting insert. On the other hand, the two outer shoulder surfaces, which diverge from the inner one, may be shorter than the engagement surface 22. Two tapering projections 41, on which the lateral shoulder surfaces are formed, form a fork-like configuration that delimits an outwardly open jaw into which the bottom part of the cutting insert may be inserted from the side.

In the tapering, rear part of the lock plate, which is delimited between the longest straight edge surface 28 and the arched edge surface 27, a through hole 34 is recessed for a securing element 35, which in this case is a tubular pin.

Figure 2:
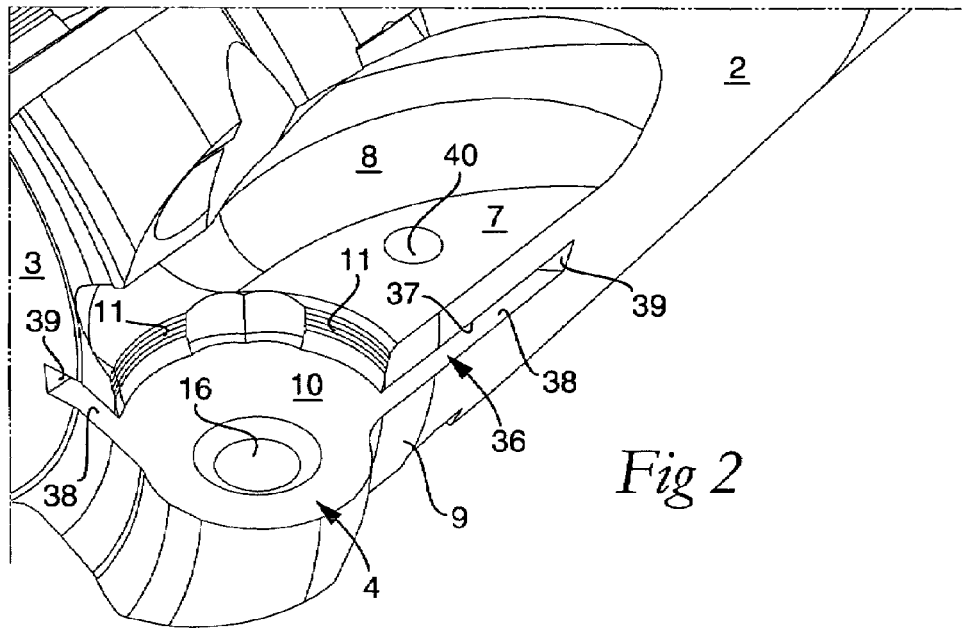
FIG. 2 is an enlarged, partial perspective view showing an individual insert seat in the basic body.
Figure 3:
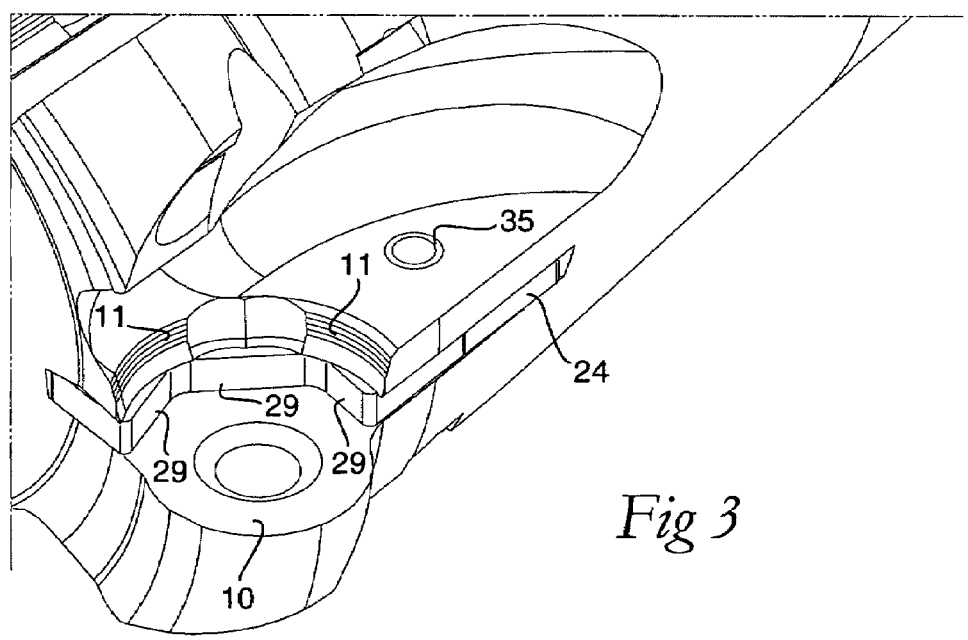
FIG. 3 is an analogous perspective view showing a lock member in accordance with an embodiment of the invention and mounted in a space adjacent to the insert seat.

Now reference is made back to FIGS. 1-3, which illustrate how a space, in its entirety designated 36, is formed in the basic body 1 to receive the lock plate 24. The space is in the form of a gap, which is delimited by two planar, upper and lower surfaces 37, 38 as well as by an inner edge surface 39, which is arched like the rear edge surface 27 of the lock plate. Specifically, the gap 36 is formed in the individual partition wall 9 between two adjacent chip pockets 6, and located in such a way that the same opens in the area between the side support surfaces 11 of the insert seat and the bottom surface 10 thereof. Advantageously, the bottom surface 10 and the lower surface 38 of the gap are situated in a common plane. In other words, in this case the surfaces 10, 38 are parts of a single, planar surface. Therefore, the gap 36 can be formed in a simple and fast way by suitable chip removing machining, e.g., milling by means of a disc-milling cutter. This is carried out in the same operation as the generation of the surface 10. In this connection, the material of the basic body 1 generally is softer than the material of the cutting inserts 5. Thus, the basic body may be manufactured from steel, aluminum or the like, while the cutting inserts are manufactured from cemented carbide or another hard and wear-resistant material. Thus, the proper basic body easily can be made by chip removing machining.

Suitably, the two edge surfaces 27, 39 may have one and the same arc-shape. This may be circular as well as non-circular. In neither of these cases, however, the lock plate, in the secured state thereof, can be angularly displaced around the center axis C1 of the cutting insert or screw hole 16, because even if the arc-shape is circular, the same is defined by a circle the center of which is far retreated from the center axis C1.

In each individual partition wall 9, a bore 40 is formed (by drilling), which in this case goes through so far that the same mouths in the front side (the surface 7) of the partition wall as well as in the back side 8 thereof (see FIG. 1). When the lock plate has been placed in the gap 36, the tubular pin 35 is applied in the bore 40 to secure the lock plate. The principal purpose of the tubular pin 35 is to retain the lock plate in the gap, but not to carry any substantial cutting forces. Thus, the cutting forces, being considerable, are carried by the bottom surface 10 of the insert seat and the side support surfaces 11, while the lock plate 24 only should resist the relatively moderate forces that aim to turn the cutting insert in relation to the center axis C1. Thus, the jaw, which is delimited between the shoulder surfaces 29 and receives the nut-like bottom part of the cutting insert, may have a certain oversize in relation to the bottom part of the cutting insert (i.e., each one of the active engagement surfaces 22 does not need to abut in close contact against the respective shoulder surface 29), and the fit between the tubular pin 35 and the hole 34 of the lock plate does not need to be fine. Thus, the diameter of the hole 34 may be somewhat greater than the outer diameter of the tubular pin 35. However, the tubular pin 35 should have a certain, moderate oversize in relation to the bore 40 in order to be fixed by press fit upon penetration into the bore. The fact that the tubular pin is fixedly pressed into the bore 40 does not prevent dismounting of the tubular pin from the bore. Thus, by means of suitable tools, the tubular pin can be struck or pressed out of the bore, if the lock plate would need to be removed from the gap 36.

By the fact that planar or out of round shoulder surfaces, requisite for the rotational securing of the cutting insert, are formed in a separate lock member, the difficulties to provide the surfaces in question are eliminated. Thus, the separate lock member can be made in serial production in a fast and efficient way, at the same time as the machining of the basic body is drastically simplified. Thus, the requisite space for the receipt of the lock member may be provided by the utmost simple measure of mill cutting a gap in the basic body. In doing so, also the planar bottom surface of the insert seat is generated. Another advantage is that all co-operating contact surfaces between the cutting insert and the basic body can be made optimally large. Thus, the shoulder surfaces of the lock member may be given the same height as the engagement surfaces of the cutting insert, besides which the underside of the cutting insert, in its entirety, can rest against the bottom surface of the insert seat (something that previously has not been possible when the cutting inserts are small and many). Furthermore, the rotational-securing function is separated from the cutting force-carrying task of the insert seat, in that the cutting forces in an absolute way are carried by the bottom and side support surfaces of the insert seat, while the rotationally securing function is effected by the lock member. Because the lock member may have certain movability in relation to the basic body, the requirements of dimensional accuracy of the shoulder surfaces are significantly reduced. An additional advantage is that the lock member serves as a safety component so far that the same easily can be exchanged if the shoulder surfaces are damaged, e.g., by wear or overload.

The invention is not limited only to the embodiments described above and shown in the drawings. Even if the invention has been exemplified in connection with a rotatable tool in the form of a milling cutter, the same may also be applied to other tools for chip removing machining, e.g., turning tools. Neither is the invention limited to round cutting inserts, in that also cutting inserts having other basic shapes may need to be rotationally secured by the use of means that do not have the purpose of carrying cutting forces but rather forces that aim to turn the cutting insert. Furthermore, the lock member does not necessarily need to be in the form of a body having a completely flat basic shape. Thus, the part of the lock member that is secured in the basic body may be made in another way than in the form of a crescent-shaped, flat rear part. The important thing is just that the shoulder surfaces of the lock member are exposed against the cutting insert in the insert seat. Furthermore, the rotationally securing shoulder surfaces of the lock member may act against engagement surfaces that are not situated in the immediate proximity of the underside of the cutting insert. Furthermore, the number of shoulder surfaces of the lock member does not need to be three. Thus, the number of shoulder surfaces may vary from a single one to a number corresponding to the number of engagement surfaces of the cutting insert. If the cutting insert, such as in the described example, includes six engagement surfaces, accordingly the lock member may be made with equally many shoulder surfaces, the shoulder surfaces being formed on the inside of a ring-shaped part of the lock member. In doing so, it is also feasible to make the lock member with a thin bottom against which the underside of the cutting insert can abut. It should also be evident that the lock member may be secured by means of other elements than tubular pins, e.g., screws, pins, or the like. In this connection, the lock member does not necessarily have to have a through hole for the securing element. Thus, instead of the hole, a recess or a cavity may be used, which opens sideward in an edge surface. Although the cutting insert in the example is shown fixed by means of a screw, it is also possible to fix the same in another way, e.g., by means of a clamp, a wedge or the like. In conclusion, the concept "out of round" should be interpreted in a wide sense, and therefore be regarded to include not only planar surfaces, but also any non-rotationally symmetrical surface that can prevent rotation of the cutting insert.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising: a basic body and a replaceable cutting insert that includes a topside, an underside, and a side surface extending therebetween, the side surface including a clearance surface, the insert being detachably mounted in an insert seat formed in the basic body, the seat being delimited by a bottom surface and at least one side support surface, the cutting insert including an out of round engagement surface as part of the side surface that is pressed against an out of round shoulder surface to rotationally secure the cutting insert, an upper part of the side surface of the cutting insert being supported by the side support surface, wherein the shoulder surface is included in a front portion of a separate lock plate, a rear portion of which is inserted and secured in a slot formed in the basic body which opens towards the insert seat at the side support surface and the bottom surface of the insert seat such that the lock plate rotationally secures a lower part of the side surface of the cutting insert.

2. The tool according to claim 1, wherein the out of round shoulder surface is formed in the front portion of the lock plate facing the insert seat, and the lock plate at the rear portion includes means to secure the lock plate in the slot.

3. The tool according to claim 2, wherein the means is a cavity in which a male-like securing element is inserted.

4. The tool according to claim 3, wherein the securing element is a tubular pin.

5. The tool according to claim 2, wherein the front portion of the lock plate is formed with two or more shoulder surfaces, which in pairs form an angle of at least 90° with each other.

6. The tool according to claim 1, wherein the slot is delimited by two planar, upper and lower surfaces that are parallel, and an inner edge surface that is arched, and the lock plate includes a rear edge surface that is arched.

7. The tool according to claim 6, wherein the contour shape of the lock plate is determined by the arched rear edge surface and two straight edge surfaces, which extend toward a common area in which the shoulder surfaces are formed.

8. The tool according to claim 7, wherein the shoulder surfaces extend from a topside to an underside of the lock plate.

9. The tool according to claim 6, wherein the lower surface of the slot is located in the same plane as the bottom surface of the insert seat, the surfaces being portions of a single, planar surface.

10. The tool according to claim 1, wherein the tool is a milling cutter, the basic body being rotatable around a central axis, and having a plurality of peripherally separated insert seats and associated chip pockets, which are respectively separated by partition walls and are individually delimited by a front side of a partition wall and a concavely arched back side of an adjacent partition wall, the lock plate and the slot for the lock plate being situated under the front side of the respective chip pocket, and a transverse bore extending to the slot from at least one of the front and back sides.

11. The tool according to claim 10, wherein the cutting insert is round and has a plurality of planar engagement surfaces in a lower part, and the lock plate has a plurality of planar shoulder surfaces for co-operation with the engagement surfaces of the cutting insert.

* * * * *